United States Patent Office 3,642,854
Patented Feb. 15, 1972

3,642,854
METHOD FOR PRODUCTION OF ISOCYANATES
Vladimir Petrovich Kozjukov, Ulitsa Dimitrova 15/20, kv. 45; Vladimir Florovich Mironov, Ulitsa Gubkina 4, kv. 13; and Viktor Dmitrievich Sheludyakov, Ulitsa Metallurgov 32, korpus 1, kv. 64, all of Moscow, U.S.S.R.
No Drawing. Filed Apr. 24, 1968, Ser. No. 729,488
Claims priority, application U.S.S.R., Apr. 26, 1967, 1,152,087; June 16, 1967, 1,164,045
Int. Cl. C07f 7/08, 7/10; C07c 119/04
U.S. Cl. 260—448.2 E                        7 Claims

ABSTRACT OF THE DISCLOSURE

A process of producing isocyanates of the formula $R(NCO)_a$, wherein R is a silyl substituted alkyl, alkenyl, alkinyl, aryl, alkaryl or aralkyl group or an alkyl, alkenyl, alkinyl or aryl group having no more than six carbon atoms and $a$ is an integer from 1 to 4, comprising subjecting a silyl-substituted amine to phosgenation at $-80°$ to $+250°$ C.

---

This invention relates to methods for the production of isocyanates having the general formula $R(NCO)_a$, wherein R is alkyl, alkenyl, alkinyl, aryl, alkaryl or aralkyl containing elements of the groups IV–VII of the periodic system, and alkyl, alkenyl, alkinyl, aryl, alkaryl, or aralkyl, and $a$ is an integer of 1 to 4.

The aforesaid isocyanates find application as components of fuel compositions and for the synthesis of polyisocyanates, polyurethanes, polyureas and other extensively employed polymers.

Moreover, organometallic diisocyanates, such as organosilicon diisocyanates, may be useful for the production of appropriate high-molecular weight products modified with isocyanate, urethane, amine and urea groups.

It is known to prepare isocyanates of the above formula by methods (cf. A. A. Blagonravova and G. A. Levkovitch, Uspekhi Khimii, 24, 1955, Moscow) which comprise phosgenating primary amines according to the following reaction scheme:

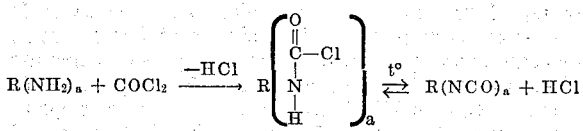

The known methods of preparing isocyanates suffer from a number of limitations, the major disadvantages being as follows:

(1) The yield of alkyl and alkenyl isocyanates is low.

(2) The necessity of using a large excess (5- to 7-fold excess) of phosgene which forms with the hydrogen chloride, evolved in the course of carrying out the reaction, highly aggressive mixtures that do not lend themselves to facile separation and call for the employment of an elaborate system of monitors and eliminators.

(3) Isocyanates are obtained as a mixture with accompanying carbamoyl chlorides, which in some instances cannot be separated, and with the products of isocyanate dimerization or polymerization.

(4) The known methods involve several stages for their accomplishment and call for a strict control of temperature conditions at various stages. For example, temperature elevation at the last stage of the aforementioned process is conducive, on the one hand, to a higher conversion of the carbamoyl chloride into the sought-for product, but, on the other hand, diminishes markedly the ultimate yield of the target isocyanate due to its enhanced polymerization, whilst at lower temperatures the carbamoyl chloride undergoes but an incomplete decomposition, thereby decreasing the yield of isocyanates.

(5) In some cases, it is mandatory to carry out phosgenation in organic solvents, which serve the useful purpose of preventing the reaction mixture from being thickened but, at the same time, affect adversely the efficiency of the process, inasmuch as a large excess of the solvents call for the employment of a more elaborate flow sheet and increases operating expenses.

It is an object of the present invention to eliminate the aforementioned disadvantages.

The principal object of the present invention is to provide a one-stage method for the production of isocyanates of the aforesaid general formula which will make it possible to use the stoichiometric amounts of the reactants and to obtain high-purity target products.

This object is accomplished by the provision of a method for the production of isocyanates which comprises treating primary amines with phosgene, wherein, according to the invention, silyl-substituted primary amines are phosgenated at a temperature of from minus 80° to plus 250° C.

The reaction proceeds in accordance with the following schematic equation:

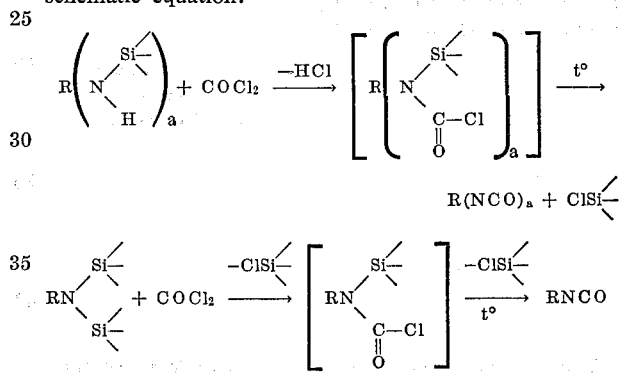

It follows from the above reaction scheme that the process involves the formation of an intermediate product, viz., N-silyl carbamoyl chloride containing a chlorine atom in the $\beta$-position to the silicon atom, which undergoes spontaneous and irreversible decomposition and yields a chlorosilane and the sought-for isocyanate.

To provide for a uniform removal of the heat evolved in the course of the exothermic phosgenation reaction and also with a view to depressing the formation of by-products and, accordingly, increasing the yield of the sought-for products, it is expedient to carry out the process at temperatures below the temperature of phosgene condensation, i.e. in the minus 80° to 0° range.

In order to prevent side reactions and increase the yield of the target products, the phosgenation of silyl-substituted amines at elevated temperatures should be carried out in an inert organic solvent medium.

The isocyanates of the aforesaid general formula can be obtained by phosgenating the compounds of the formula

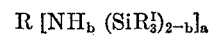

wherein

R is alkyl, alkenyl, alkinyl, aryl, alkaryl, or aralkyl containing elements of the groups IV–VII of the periodic system, alkyl, alkenyl, alkinyl, aryl, alkaryl, and aralkyl;

$R^1$ is hydrogen, alkyl, aryl, alkaryl, or aralkyl taken singly or in various combinations thereof;

$a$ is an integer of 1 to 4, and $b$ is an integer of 0 to 1.

Isocyanates represented by the general formula

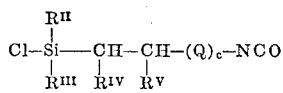

wherein $R^{II}$, $R^{III}$ stand for alkyl or aryl taken singly or in a combination;
$R^{IV}$, $R^V$ stand for hydrogen, alkyl, aryl, alkaryl, and aralkyl taken singly or in various combinations thereof;
Q is a divalent aliphatic or aromatic radical containing elements of the groups IV-VII of the periodic system and a divalent aliphatic or aromatic radical;
c is an integer of 0 to 1, can likewise be prepared by phosgenating silyl-substituted primary amines having the general formula

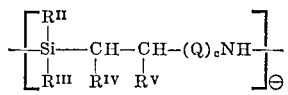

wherein $R^{II}$, $R^{III}$, $R^{IV}$, $R^V$ and Q stand for radicals as defined hereinabove;
c is an integer from 0 to 1, and
e is an integer greater than unity.

Isocyanates of the general formula RNCO, wherein R is as defined before, can be prepared by phosgenating silyl-substituted primary amines represented by the formula

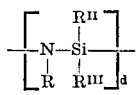

wherein

R, $R^{II}$, and $R^{III}$ are as defined before, and
d is an integer of 3 or greater.

The present method has made it possible to prepare novel compounds which are also claimed in the present invention.

The novel compositions of matter-isocyanates are represented by the following general formulae:

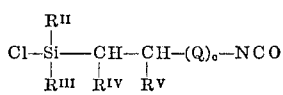

wherein $R^{II}$ and $R^{III}$ stand for alkyl and aryl taken either singly or in a combination thereof;
$R^{IV}$ and $R^V$ are hydrogen, alkyl, aryl, alkaryl, and aralkyl taken either singly or in various combinations thereof;
Q is a divalent aliphatic or aromatic radical containing elements of the groups IV-VII of the periodic system, and a divalent aliphatic or aromatic radical, and c is an integer of 0 to 1, and

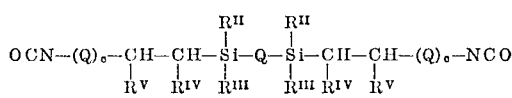

wherein $R^{II}$, $R^{III}$, $R^{IV}$, $R^V$, and Q stand for radicals defined before;
c is an integer of 0 to 1, and
Q' is oxygen, sulphur, $-(CH_2)_f-$, wherein $f \geqslant 1$, and ortho-, meta-, or para-phenylene The present method for the production of isocyanates of the general formula $R(NCO)_a$ is accomplished in the following manner.

Silyl-substituted primary amines are added, with stirring, to liquid phosgene, the reactants being taken in stoichiometric amounts or the phosgene being taken in a slight excess. The reaction is carried out under mild conditions in the temperature range of from minus 80° to plus 250° C. At elevated temperatures, it is expedient to carry out the phosgenation in an inert organic solvent medium, such as cumene, toluene, and dichlorobenzene.

Upon the termination of the reaction, the reaction mixture is subjected to fractional distillation to recover the sought-for product.

For a better understanding of the present invention, the following examples of preparing isocyanates are given by way of illustration.

EXAMPLE 1

Methyl isocyanate

In a four-necked flask, fitted with a reflux condenser, a stirrer, a thermometer, and a dropping funnel, there is condensed 30-35 g. (0.30-0.35 mole) of phosgene and to the contents of the flask maintained at a temperature of −35° to −40° C. is added during 1 hour 29-34 g. (0.29-0.34 mole) of methylaminotrimethylsilane. Then, the reaction mixture is heated to room temperature and, with a rectifying column connected to the reaction flask, fractionated to yield 14.9 g. of methyl isocyanate (approx. 90% of the theoretical amount) boiling in the 43-45° range and 29.8 g. of trimethylchlorosilane (approx. 95% of the theoretical amount); B.P. 56-57° C.

EXAMPLE 2

Methyl isocyanate

By following the procedure of Example 1, 52.5 g. (0.3 mole) of bis-(trimethylsilyl)methylamine and 32 g. (0.32 mole) of phosgene are reacted to yield 60 g. of trimethylchlorosilane (94% of the theoretical amount) and 15.4 g. of methyl isocyanate (90% of the theoretical amount); B.P. 44-45° C.

EXAMPLE 3

Methyl isocyanate

By following the procedure of Example 1, 33 g. (0.33 mole) of phosgene is reacted with 32.3 g. (0.33 mole calculated as monomer) of a mixture of linear, cyclic, olygomeric and polymeric silazanes, prepared by treating dimethylchlorosilane with an excess of methyl amine in benzene. Dimethyldichlorosilane is obtained in a quantitative yield (B.P. 69-70° C.) and the yield of methyl isocyanate equals 17.1 g. (91% of the theoretical amount); B.P. 43-45° C.

EXAMPLE 4

Isobutyl isocyanate

To 15 g. (0.15 mole) of liquid phosgene maintained at −40° C. there is added, with vigorous stirring, a solution of 17 g. (0.12 mole) of N-trimethylsilylisobutyl amine in 50 ml. of cumene. The mixture is heated to 20° C., followed by distilling off the excess phosgene, removing by filtration a small amount of the precipitate formed, and fractionating the clear solution thus obtained with a Hempel column. The reaction products consist of trimethylchlorosilane (98% of the theoretical amount) and 10.5 g. of isobutyl isocyanate (90.5% of the theoretical amount); B.P. 101-102° C.

EXAMPLE 5

Allyl isocyanate

In a four-necked flask of Example 1 there is condensed 30-35 g. (0.30-0.35 mole) of phosgene and to the contents of the flask maintained at a temperature of −35° to −40° C. is added for a period of one hour 38 g. (0.29 mole) of N-trimethylsilylisopropyl amine in 100 ml. of anhydrous isopropylbenzene. Then the reaction mixture is brought to boiling and the excess phosgene is distilled off. The residue is boiled for 2 hours with a reflux condenser so as to maintain in the flask a temperature of 95–98° C., followed by fractionating the reaction products with a 40-cm. column. The reaction yields 22 g. of trimethylchlorosilane (69.3% of the theoretical amount) and 20.5 g. of allyl isocyanate (84% of the theoretical amount); B.P. 83.5° C. at 740 mm. Hg.

EXAMPLE 6

Allyl isocyanate

By following the procedure disclosed in Example 5, 20.1 g. (0.1 mole) of N-allylhexamethyldisilazane is reacted with 12 g. (0.12 mole) of phosgene to yield 7.1 g. of allyl isocyanate (86% of the theoretical amount) boiling at 83–84° C. and 19.4 g. of trimethylchlorosilane (90% of the theoretical amount); B.P. 56–57° C.

EXAMPLE 7

Allyl isocyanate

By following the procedure disclosed in Example 5, 22.6 g. (0.2 mole calculated as monomer) of a mixture of linear, cyclic, oligomeric and polymeric N-allyl-methyl-silazanes of the type

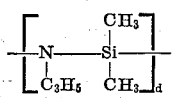

wherein $d \geqslant 3$ and 21 g. (0.21 mole) of phosgene yield 14.2 g. (87% of the theoretical amount) of allyl isocyanate; B.P. 83–85° C.

EXAMPLE 8

Phenyl isocyanate

In a four-necked flask of Example 1 there is condensed 22 g. (0.22 mole) of phosgene and, while maintaining the temperature in the flask at −80° to −50° C., 33 g. (0.2 mole) of phenylaminotrimethylsilane is added, with stirring, thereto for a period of 1 hour. Then the reaction mixture is brought to room temperature, a small quantity of precipitate formed is filtered off, and the filtrate is fractionated to yield 17.4 g. (85% of the theoretical amount) of trimethylchlorosilane and 19 g. (80% of the theoretical amount) of phenyl isocyanate; B.P. 162° C.

EXAMPLE 9

Phenyl isocyanate

By following the procedure of Example 8, the reaction between 23.7 g. (0.1 mole) of N-bis(trimethylsilyl) aniline and 11 g. (0.11 mole) of phosgene yields 8.9 g. of phenyl isocyanate (75% of the theoretical) and 17.3 g. of trimethylchlorosilane (80% of the theoretical).

EXAMPLE 10

Phenyl isocyanate

In accordance with the procedure of Example 8, the reaction between 15 g. (0.1 mole calculated as monomer) of a mixture of linear, cyclic, oligomeric and polymeric N-phenylmethylsilazanes of the type

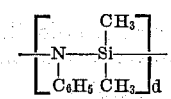

wherein $d \geqslant 3$ and 10.5 g. (ca. 0.1 mole) of phosgene yields 9.0 g. of phenyl isocyanate (77% of the theoretical amount) and 10.3 g. of dimethyldichlorosilane (80% of the theoretical amount).

EXAMPLE 11

γ-Diethylmethylsilylpropyl isocyanate

A mixture of 9.0 g. (0.09 mole) of diethylmethylsilane and 11.4 g. (0.09 mole) of N-trimethylsilylallyl amine in the presence of 5 drops of the Speier's catalyst on boiling for a period of 2 hours (the ultimate temperature in the flask is 160° C.) yields 18.8 g. of γ-(trimethylsilylamino) propyldiethylsilane; B.P. 63° C./2 mm. Hg; $d_4^{20}$ 0.8142 and $n_D^{20}$ 1.4405.

Into a four-necked flask of Example 1 there is condensed 10 g. (0.1 mole) of phosgene while cooling the flask −40°—−70° C. with a Dry Ice-acetone mixture, followed by adding to the cooled flask, with vigorous stirring, 16.4 g. (0.07 mole) of γ-(trimethylsilylamino-propyl) diethylsilane. Then cooling the contents of the flask is discontinued, and the reaction mixture is stirred for 30 minutes and thereafter heated to remove the excess phosgene and 5.7 g. (75% of the theoretical) of trimethylchlorosilane. The residue is maintained for an additional 30 minutes at a temperature of 150° C. and thereafter fractionated in vacuo to yield 8.7 g. of γ-diethylmethylsilylpropyl isocyanate (66.5% of the theoretical); B.P. 57–85° C./2 mm. Hg; $d_4^{20}$ 0.8963; $n_D^{20}$ 1.4478.

Treating 1.2 g. of γ-diethylmethylsilylpropyl isocyanate with aqueous ammonia results in the formation of 1.3 g. of N-γ-diethylmethylsilylpropyl urea (99% of the theoretical); M.P. 107° C. (recrystallization twice from aqueous acetone).

EXAMPLE 12

γ-Dimethylchlorosilylpropyl isocyanate

Into a three-necked 2 lit flask fitted with a stirrer, a dropping funnel and a reflux condenser is charged a solution of 96.6 g. (1.7 moles) of allyl amine in 300 ml. of anhydrous diethyl ether followed, while stirring the solution and cooling the flask with a tap water stream, by the dropwise addition of 79.4 g. (0.8 mole) of dimethylchlorosilane. The reaction mixture is stirred for an additional 30 minutes at room temperature and thereafter filtered in a stream of nitrogen. The hydrochloride of allyl amine separated from the reaction mixture is washed with three 50-ml. portions of anhydrous diethyl ether. The filtrate is fractionated with a 40-cm. rectifying column to yield 74.4 g. of allylaminodimethylsilane (76% of the theoretical); B.P. 99–100° C.; $d_4^{20}$ 0.7704; $n_D^{20}$ 1.4162. The residue in the flask consists of N,N-bis (dimethylsilyl) allyl amine; B.P. 45–46° C./15 mm. Hg; $d_4^{20}$ 0.8277; $n_D^{20}$ 1.4344.

Into a two-necked 100-ml. flask is placed 37 g. (0.3 mole) of allylaminodimethylsilane, 5–10 drops of a 0.2 N solution of $H_2PtCl_6$ in isopropanol is added thereinto, and the contents of the flask are refluxed until the temperature in the flask rises to 210–220° C. The resultant viscous, non-distillable polymer is an oily liquid which dissolves readily in conventional inert organic solvents.

Into a four-necked 200-ml. flask, fitted with a condenser and a Dry Ice-acetone trap, a stirrer, a bubbler, and a thermometer, there is condensed 35 g. (0.35 mole) of phosgene and, while maintaining a temperature of from −20° to −10° C. in the flask, the polymer dissolved in 100 ml. of anhydrous toluene is added dropwise. The reaction mixture is stirred for about 30 minutes at room temperature, then the cold trap is replaced with a reflux condenser, the excess phosgene is distilled off, and the solution is refluxed, while being stirred, for a period of 2 hours. On stripping off the toluene, the mixture is distilled in vacuum to yield 40.4 g. of γ-dimethylchlorosilylproyl isocyanate (71.3% of the theoretical amount based on monomeric allylaminodimethylsilane); B.P. 52–53° C./2 mm. Hg and 75–76° C./8 mm. Hg; $d_4^{20}$ 1.0444; $n_D^{20}$ 1.4528.

EXAMPLE 13

1,1,3,3-tetramethyl-1,3-bis (γ-isocyanatopropyl) disiloxane

Into a four-necked flask of Example 1 there is condensed 20 g. (0.2 mole) of phosgene and to it is added, with vigorous stirring and while maintaining the temperature in the flask at −70° to −50° C., for a period of 1 hour 42.8 g. (0.2 mole) of bis-(γ-trimethylsilylaminopropyl) tetramethyldisiloxane prepared by hydrosilylation of N-trimethylsilylallyl amine with tetramethyldisiloxane, followed by gradually heating the reaction mixture until it attains room temperature, purging the reaction mixture with nitrogen, at a slightly elevated temperature, to remove the excess phosgene, and fractionating the residue. The reaction yields 19.4 g. of trimethylchlorosilane (90% of the theoretical amount), 23.6 g. of 1,1,3,3-tetramethyl-1,3-bis (γ-isocyanatopropyl)disiloxane (70% of the theoretical amount), B.P. 131–132° C./2 mm. Hg or 115–116° C./1.5 mm. Hg, $d_4^{20}$ 0.9980, $n_D^{20}$ 1.4489, and also γ-dimethylchlorosilylpropyl isocyanate (ca. 20% of the theoretical amount).

EXAMPLE 14

Bis-[γ-(isocyanatopropyldimethylsilyl)methyl]methane

A mixture of 6 g. (37.4 millimole) of bis(dimethylsilyl)-methane and 9.7 g. (74.8 millimole) of N-trimethylsilyl-allyl amine is refluxed for 1 hour at a tempearture of 110–190° C. in the presence of the Speier's catalyst to yield 13.0 g. of γ-(N-trimethylsilylamino)propyldimethylsilyl-methane (83% of the theoretical amount), B.P. 148–150° C./1.5 mm. Hg; $d_4^{20}$ 0.8465; $n_D^{20}$ 1.4565.

Into a four-necked flask of Example 1 there is condensed approx. 5 g. (0.05 mole) of phosgene and, while maintaining the temperature in the flask at −40° C., to it is added the symmetric disilyl-substituted diamine prepared as described hereinabove. The reaction proceeds rapidly and results in the formation of a clear solution and an insignificant fine precipitate. The liquid layer is decanted and freed from the excess phosgene and volatile compounds by heating and purging with nitrogen. The residue is maintained for 1 hour at a temperature of 110–120° C. and thereafter fractionated to yield 7.3 g. of bis-[γ-(isocyanatopropyldimethylsilyl)methyl]methane; B.P. 175–178° C./3.5 mm. Hg; $n_D^{20}$ 1.4708.

The precipitate is washed with ether, and ether evaporation gives additional 2.7 g. of the target diisocyanate, the overall yield of the sought-for product being 10 g. (83.3% of the theoretical amount).

EXAMPLE 15

1,2-bis-[(γ-isocyanatopropyl)dimethylsilyl]ethane

By following the procedure disclosed in Example 14, the reaction between 40.4 g. (0.1 mole) of 1,2-bis [(γ-trimethylsilylaminopropyl)dimethylsilyl]ethane and 21 g. (0.21 mole) of phosgene yields 25.4 g. of 1,2-bis[(γ-isocyanatopropyl)dimethylsilyl]ethane; B.P. 134–135° C./2 mm. Hg; $d_4^{20}$ 0.9654; $n_D^{20}$ 1.4715.

EXAMPLE 16

1,3-bis-[(γ-isocyanatopropyl)dimethylsilyl]propane

By following the procedure disclosed in Example 14, the reaction between 41.6 g. (0.1 mole) of 1,3-bis-[(γ-trimethylsilylaminopropyl)dimethylsilyl]propane and 21 g. (0.21 mole) of phosgene yields 28.2 g. of 1,3-bis-[(γ-isocyanatopropyl)-dimethylsilyl]propane (87% of the theoretical amount); B.P. 148–150° C./2 mm. Hg; $d_4^{20}$ 0.9591; $n_D^{20}$ 1.4701.

EXAMPLE 17

1,4-bis-[(γ-isocyanatopropyl)dimethylsilyl]benzene

By following the procedure disclosed in Example 14, the reaction between 22.6 g. (0.10 mole) of 1,4-bis-[(γ-trimethylsilylaminopropyl)dimethylsilyl]benzene and 21 g. (0.21 mole) of phosgene yields 31.7 g. of 1,4-bis-[(γ-isocyanatopropyl)dimethylsilyl]benzene (88% of the theoretical amount); B.P. 180–185° C./2 mm. Hg; $d_4^{20}$ 1.0309; $n_D^{20}$ 1.5187.

Other mono-, di- and polyisocyanates corresponding to the aforesaid general formula can be obtained by following the procedures disclosed in the examples, the yield being 50% or better of the theoretical.

The present method for the production of isocyanates lends itself readily to the employment on a commercial scale and is further noted for its superior efficiency as compared to the prior art methods.

The present method is further advantageous in that it makes possible the production of both lower and higher members of isocyanate homologous series. An added advantage of the present method is that it can be accomplished at low temperatures, the latter feature being of prime importance wherein the isocyanates being synthesized the radical R defined before contains groupings that are temperature-sensitive in the presence of phosgene or hydrogen chloride and chlorosilanes formed in the course of the synthesis of isocyanates.

Such groupings are as follows:

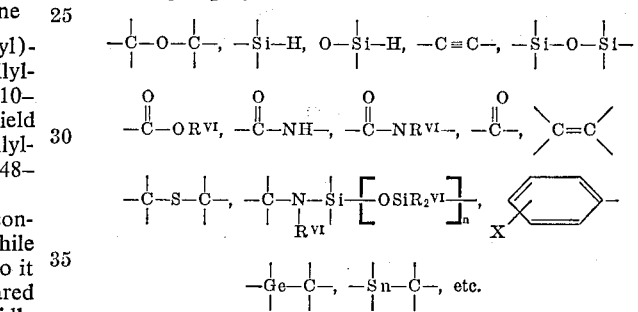

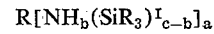

wherein $R^{VI}$ stands for alkyl, X denotes Hal, $NO_2$, or $OR^{VI}$, and $n$ is an integer greater than unity.

The present method renders it possible to carry out phosgenation in the absence of inert organic solvents, thereby making the manufacturing process essentially simpler and cheaper.

The present method provides for high yields of the target products noted for their high purity.

Although the present invention has been described with reference to the preferred embodiment thereof, it will be readily understood by those skilled in the art that various changes or modifications may be practised therein as long as such changes or modifications mark no material departure from the spirit and scope of the appended claims.

We claim:

1. A method for the production of isocyanates of the formula $R(NCO)_a$, wherein R is a silyl substituted alkyl, alkenyl, alkinyl, aryl, alkaryl or aralkyl group, or an alkyl, alkenyl, alkinyl or aryl groups having not more than six carbon atoms, and $a$ is an integer of 1 to 4, which comprises subjecting a silyl-substituted amine to phosgenation at a temperature of from minus 80° to plus 250° C.

2. A method according to claim 1, wherein the phosgenation is carried out at a temperature of from minus 80° to 0° C.

3. A method according to claim 1, wherein the phosgenation is carried out in the presence of an inert organic solvent.

4. A method according to claim 2, wherein the phosgenation is carried out in the presence of an inert organic solvent.

5. A method according to claim 1, in which the silyl-substituted amine is represented by the formula $$R[NH_b(SiR_3)^1{}_{c-b}]_a$$

wherein R is as defined above, $R^I$ is hydrogen, alkyl, aryl, alkaryl, or aralkyl taken either singly or in various combinations thereof, $a$ is an integer of 1 to 4, and $b$ is an integer of 0 to 1, the phosgenation of said compounds yielding isocyanates of the general formula $R(NCO)_a$, wherein R and $a$ are as defined above.

6. A method according to claim 1, in which the silyl-substituted amine is represented by the formula

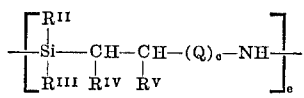

wherein $R^{II}$, $R^{III}$ stand for alkyl or aryl taken either singly or in a combination; $R^{IV}$, $R^V$ stand for hydrogen, alkyl, aryl, alkaryl, or aralkyl taken either singly or in various combinations thereof; Q is a silyl substituted divalent aliphatic or aromatic radical, and a divalent aliphatic or aromatic radical; $c$ is integer of 0 to 1, and $e$ is an integer greater than unity, the phosgenation of said compounds yielding isocyanates of the general formula

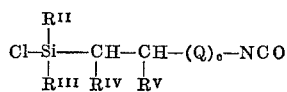

wherein $R^{II}$, $R^{III}$, $R^{IV}$, $R^V$, and Q are as defined before, and $c$ is an integer of 0 to 1.

7. A method according to claim 1, in which the silyl-substituted amine is represented by the general formula

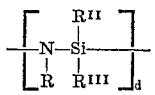

wherein R, $R^{II}$, and $R^{III}$ are as defined before, and $d$ is an integer equal to or greater than 3, the phosgenation of said compounds yielding isocyanates of the general formula RNCO, wherein R is as defined before.

References Cited
UNITED STATES PATENTS

| | | | |
|---|---|---|---|
| 3,170,891 | 2/1965 | Speier | 260—448.2 X |
| 3,179,622 | 4/1965 | Haluska | 260—448.2 X |
| 3,179,713 | 4/1965 | Brown | 260—448.2 X |
| 3,320,184 | 5/1967 | Fink | 260—448.2 X |
| 3,426,057 | 2/1969 | Kanner | 260—448.2 N |
| 3,453,243 | 7/1969 | Hartlein | 260—448.2 X |

TOBIAS E. LEVOW, Primary Examiner

P. F. SHAVER, Assistant Examiner

U.S. Cl. X.R.

260—448.2 N, 453 A